Sept. 27, 1932. T. GRAY 1,879,195
CUTTER BAR
Filed March 2, 1931
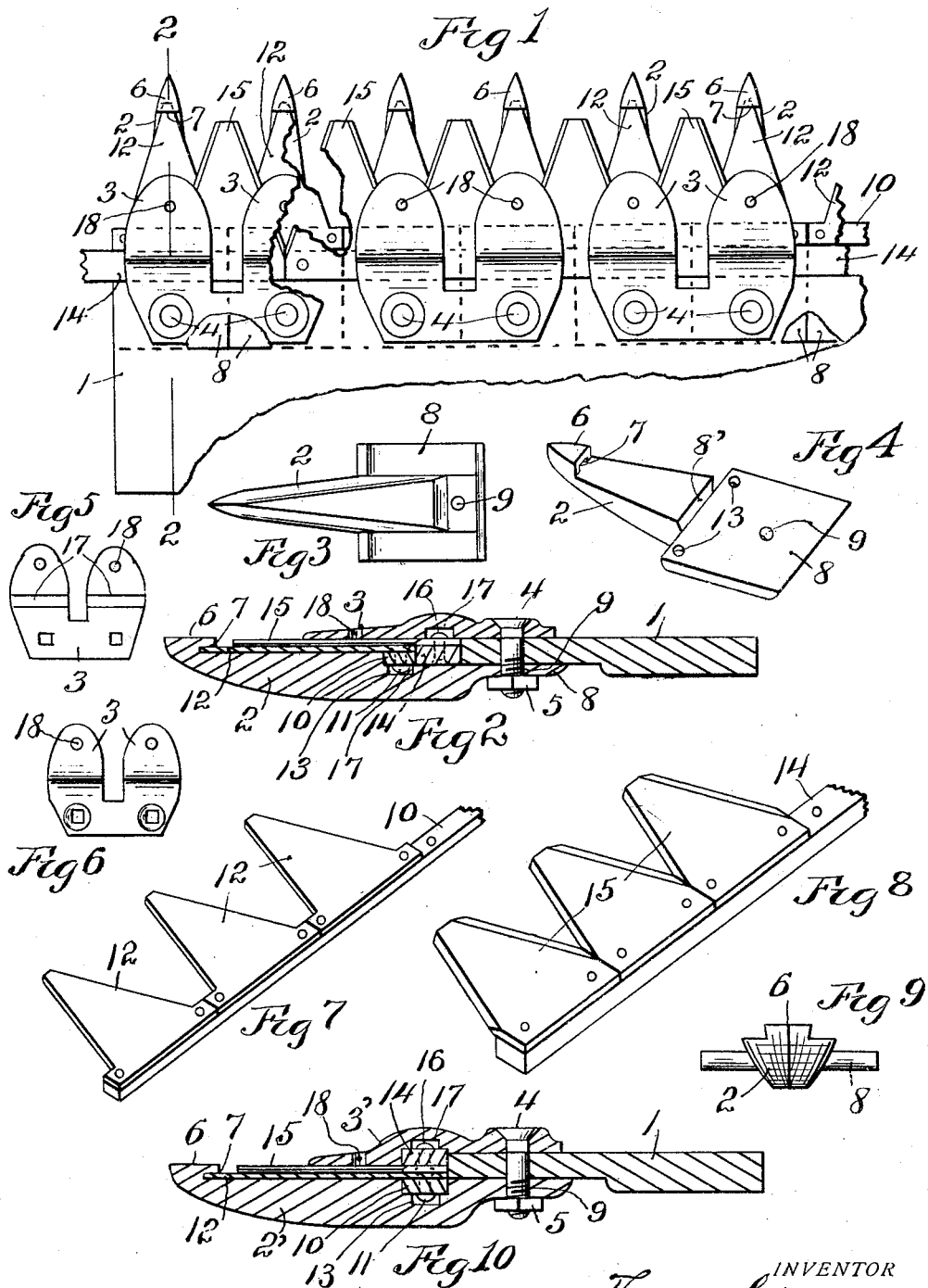
INVENTOR
Thomas Gray
Warren D. House,
BY
His ATTORNEY
Witness
H. Vernon Olson Patented Sept. 27, 1932

1,879,195

UNITED STATES PATENT OFFICE

THOMAS GRAY, OF LYNDON, KANSAS, ASSIGNOR OF ONE-HALF TO JOHN GUTSMITHL AND G. H. HOERMAN, BOTH OF LYNDON, KANSAS

CUTTER BAR

Application filed March 2, 1931. Serial No. 519,482.

My invention relates to improvements in cutter bars adapted for use of mowing machines, reapers and the like.

One of the objects of my invention is to provide a cutter bar, of the type having reciprocative upper blades cooperating with stationary lower blades, which permits of the removal of the lower blades as a unit for the purpose of sharpening or replacement.

A further object of my invention is the provision of a novel cutter bar of the kind described and which employs a finger bar, which permits the upper and lower blades to be removed respectively as units without having to disassemble the other parts of the cutter bar.

Still another object of my invention is to provide a novel cutter bar of the kind described, which is very simple, strong, durable, not likely to get out of order, which is cheap to make, is efficient in operation, and which can be easily and quickly assembled or disassembled.

The novel features of my invention are hereinafter fully described and claimed.

In the accompanying drawing which illustrates my invention,

Fig. 1 is a plan view, partly broken away, of a cutter bar provided with one form of my improvement, the reciprocative blade bar being shown in its midway position.

Fig. 2 is an enlarged section on the line 2—2 of Fig. 1.

Fig. 3 is a bottom view of one of the fingers.

Fig. 4 is a perspective view of the same.

Fig. 5 is a bottom view of one of the guard members, reduced.

Fig. 6 is a top view of the same.

Fig. 7 is a perspective view of the stationary bar and some of the lower blades attached thereto, the bar being broken away.

Fig. 8 is a similar view of the reciprocative blade bar, broken away, and upper blades attached thereto.

Fig. 9 is a front end view of one of the fingers.

Fig. 10 is a cross sectional view, similar to Fig. 2, showing a modified form of my invention.

Similar reference characters designate similar parts in the different views.

Referring to Figs. 1 to 9, the cutter bar shown is provided with a finger bar consisting of a horizontal supporting member 1, to the under side of which are attached and project forwardly therefrom fingers 2, and to the upper side of which member are fastened guard members 3, of U form, the arms of which respectively project forwardly over the fingers 2, Fig. 1. Bolts 4 extend through the guard members 3, the supporting member 1 and the fingers 2, the heads of said bolts bearing on the guard members, and nuts 5 on the bolts 4 bearing against the under sides of the fingers 2, thereby holding these parts rigidly together.

The front end portion of each finger 2 has a raised portion 6 in the rear side of which is a rearwardly facing recess 7 having side walls, Figs. 2 and 4. The rear portion of each finger 2 has a flat depressed portion 8, of rectangular form which has therethrough a vertical hole 9, through which one of the bolts 4 extends, Fig. 4. At the front end of the flat portion 8 is a wall which forms an abutment 8' against which is adapted to bear a stationary blade bar 10. Fig. 2, to the upper side of which are rigidly attached, as by rivets 11, lower blades 12, the forward ends of which respectively rest on the fingers 2, and the forward ends of which extend into the recesses 7 and are held from lateral movement by said side walls of said recesses in the fingers 2. Figs. 1 and 2. The upper side of each portion 9 of the finger is provided with recesses 13 adapted to receive the heads of the rivets 11. Figs. 2 and 4.

Longitudinally reciprocative on the portions 8 of the fingers 2 is a blade bar 14, the forward side of which slidably engages the rear side of the blade bar 10, thereby holding the latter in its operative position with the lower blades 12 in the recesses 7 of the fingers, and preventing rearward or longitudinal movement of the stationary bar 10.

Fastened at their rear ends to the upper side of the reciprocative blade bar 14 are upper blades 15, which, like the lower blades 12, are of the usual forwardly converging type with sharpened side edges. The guard members 3 extend over the blades 15 and hold the latter and the reciprocative blade bar 14 from upward movement. The blades 15 may be fastened to the blade bar 14 by rivets 16, Fig. 2, and the under sides of the arms of the guard members are provided with grooves 17, Figs. 2 and 5 for receiving the heads of said rivets 16, and permit the reciprocation of the blade bar 14.

By having the lower blades 12 fastened to the stationary blade bar 10, instead, as is usually done, of being separately fastened to the fingers, the blades and the bar 10 can be removed, as a unit, for sharpening or replacement. And in sharpening, their upper surfaces being in the same plane and the blades all held together, the blades may all be sharpened at one operation, by grinding their upper surfaces.

My improved cutter bar also provides an additional very important advantage, when used with machines the construction of which permits the blade bars 10 and 14 to be removed lengthwise from the cutter bar. Such advantage consists in the fact that in machines of the kind stated, the blade bars 10 and 14 with their blades may be removed from or inserted into the finger bar without disassembling any parts of the latter.

Such removal is accomplished by first detaching the reciprocative blade bar 14 from the member which reciprocates it, and then longitudinally withdrawing the said bar 14 and its blades 15 from between the guard members 3 and the fingers 2.

The blade bar 10 may then be lifted and moved rearwardly to a position in which the lower blades 12 are out of the recesses 7 of the fingers 2, in which retracted position, the blade bar 10 may be withdrawn longitudinally from between the fingers 2 and the guard members 3 together with the lower blades 12, such withdrawal of the blade bars and their blades being effected without having to detach the fingers 2 nor the guard members 3.

By reversing the operation described, the parts may be reassembled, without any disassembling of the finger bar parts.

As shown in Fig. 1, the rectangular flat portions 8 of the fingers 2 abut against each other at their side edges, thus affording a strong construction which prevents any of the fingers swinging laterally on the attaching bolt 4.

The construction of the modification, shown in Fig. 10, corresponds to that shown in Figs. 1 and 2, excepting that the reciprocating blade bar 14 is disposed above the blades 15 and 12 and the stationary bar 10, and the grooves 17 in the under sides of the arms of the guard members 3' being wide enough to receive the reciprocative bar 14, and in the portions of the fingers 2' at the rear of the bar 10 being in the same horizontal plane as the portions of the fingers immediately in front of said bar 10.

In the modified form shown in Fig. 10, the guard members 3' must be removed in order to remove the bar 10 and its blades.

It will be noted that the guard members 3, Fig. 2, and 3', Fig. 10, extend over and are close to the upper blades 15, thereby preventing the blades 15 from lifting from the lower blades 12. Said guard members 3 and 3' have their arms provided with oil holes 18 through which oil may be injected upon the blades 12 and 15.

I do not limit my invention to the structures shown and described, as many modifications, within the scope of the appended claim, may be made without departing from the spirit of my invention.

What I claim is:—

In a cutter bar the combination with a longitudinal finger bar, fingers extending forwardly therefrom, a stationary blade bar supported on said fingers, lower stationary blades fastened to said blade bar and supported on said fingers, and upper blades slidably engaging the upper sides of said lower blades, of a longitudinally slidable blade bar, to which said upper blades are attached, slidably engaging the rear edge of said stationary blade bar, the upper sides of said fingers and the front edge of said finger bar, and guard members engaging said upper blades and bearing and fastened against the upper side of said finger bar.

In testimony whereof I affix my signature.

THOMAS GRAY.